Figure 1:
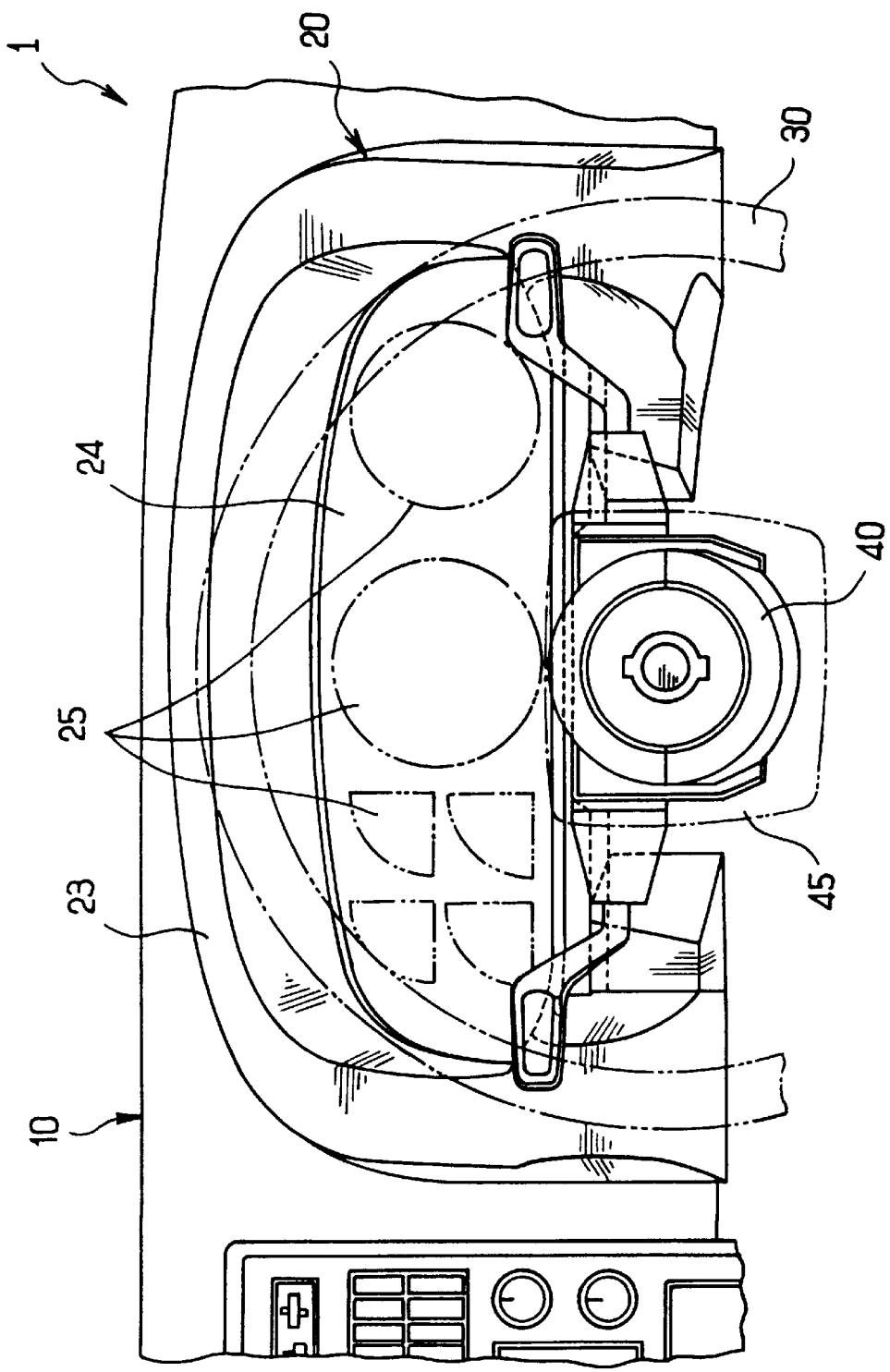

United States Patent
Guiard et al.

[11] Patent Number: 6,149,196
[45] Date of Patent: Nov. 21, 2000

[54] PROTECTION DEVICE FOR THE DRIVER OF A VEHICLE

[75] Inventors: Christophe Guiard, Boissy L'Aillerie, France; Anders Scheutz, Ytterby, Sweden; Denis Tostain, Cergy le Haut, France

[73] Assignee: Sai Automotive Allibert Industrie, France

[21] Appl. No.: 09/353,638

[22] Filed: Jul. 15, 1999

[30] Foreign Application Priority Data

Jul. 16, 1998 [FR] France .................................. 98 09103

[51] Int. Cl.$^7$ ................................................. B62D 1/19
[52] U.S. Cl. .............................................. 280/777; 296/74
[58] Field of Search .................................... 280/777, 753, 280/779, 775; 74/493, 492; 188/371, 376; 296/70, 74, 188, 189, 194

[56] References Cited

U.S. PATENT DOCUMENTS

| | | | |
|---|---|---|---|
| 3,556,550 | 1/1971 | Franchini | 280/87 |
| 4,400,012 | 8/1983 | Otsuka | 280/777 |
| 5,052,240 | 10/1991 | Miyoshi et al. | 74/493 |
| 5,067,747 | 11/1991 | Yokoyama | 280/777 |
| 5,280,956 | 1/1994 | Tanaka et al. | 280/777 |
| 5,452,916 | 9/1995 | Beecher et al. | 280/777 |
| 5,605,073 | 2/1997 | Milton et al. | 74/492 |
| 5,609,063 | 3/1997 | Hedderly et al. | 74/492 |
| 5,664,823 | 9/1997 | Misra et al. | 296/70 |

FOREIGN PATENT DOCUMENTS

| | | | |
|---|---|---|---|
| 2487280 | 3/1986 | France . | |
| 0412276 | 2/1991 | France . | |
| 2732661 | 10/1996 | France . | |
| 27 51 068 A1 | 12/1978 | Germany | 280/777 |
| 07-61308 | 7/1995 | Japan . | |

*Primary Examiner*—J. J. Swann
*Assistant Examiner*—J. Allen Shriver
*Attorney, Agent, or Firm*—Rothwell, Figg, Ernst & Manbeck

[57] ABSTRACT

A protection device for the driver of a vehicle equipped with a dashboard and a steering wheel, in order to provide, on impact, a displacement of the steering wheel towards the dashboard, said steering wheel being mounted on a steering column passing under an instrument-carrying zone situated with regard to the steering wheel and connected to, but distinct from, the dashboard, said protection device comprising means for displacement of the instrument-carrying zone, the displacement means being adapted to move the instrument-carrying zone, on impact, in one of an upward vertical direction and in a direction having a vertical upward component, wherein the means for displacement of the instrument-carrying zone connect the steering column directly to said instrument-carrying zone, so that, on impact, said displacement of the steering column results in the displacement of the instrument-carrying zone along said direction.

9 Claims, 7 Drawing Sheets

FIG_1

FIG_4

PROTECTION DEVICE FOR THE DRIVER OF A VEHICLE

This invention relates to devices for the protection of the occupants of a vehicle, and in particular of the driver of a vehicle.

It is known that in the case of impact, more particularly frontal or semi-frontal impact, the driver can be thrown forwards against the steering wheel (even if he is wearing his seatbelt), which can be very injurious to him. The risk is even greater because the steering wheel is limited in its movements in the direction of the dashboard, whether unexpected (on impact with the driver) or whether foreseen. There exist in particular devices which permit the movement of the steering column towards the engine compartment and the steering wheel towards the dashboard, most often combined with other devices of the airbag type and/or seat belts with preprogrammed tension. The aim of this type of device is to reduce the contact between the head (or the rib cage) of the driver and the steering wheel.

Such devices are in particular described in FR-B-2 487 280, U.S. Pat. No. 5,067,747 or U.S. Pat. No. 4,400,012.

However, these solutions are not satisfactory because they do not permit the steering wheel to move forward sufficiently in the direction of the dashboard which thus creates an obstacle. In effect, when the steering column moves forward, along a substantially horizontal axis (or, more likely, along an axis parallel to the floor of the vehicle), the steering wheel fairly quickly (within several centimeters, typically 5 to 35) meets the zone (combined instrument panel and dashboard) which carries the instruments (that part of the dashboard disposed facing the steering wheel in front of the driver, and on which the principal instruments such as the rev counter, the speedometer/milometer and the function warning lights of the vehicle are disposed behind a screen). The risk of impact with the driver therefore still remains relatively high.

The object of the present invention is thus to resolve this problem by proposing a system which is simple to put into operation, reliable, and certain, permitting the steering wheel to move more easily, in an unexpected or a foreseen manner, in the direction of the dashboard. This device can be used in cars, lorries or even buses, and can be compatible in particular with a steering wheel equipped with a safety airbag.

With this object, the invention thus comprises a protection device for the driver of a vehicle equipped with a dashboard and a steering wheel, in order to provide, on impact, a displacement of the steering wheel towards the dashboard, the said steering wheel being mounted on a steering column passing under an instrument-carrying zone situated with regard to the steering wheel and connected to, but distinct from, the dashboard, said protection device comprising means for displacement of the instrument-carrying zone (thus, possibly, the elements which may be immediately surrounding it being functionally and/or structurally attached to it), the displacement means being adapted to move the instrument-carrying zone, on impact, in one of an upward vertical direction and a direction having a vertical upward component, wherein some of said means for displacement of the instrument-carrying zone connect the steering column to the said instrument-carrying zone, so that, on impact, said displacement of the steering column results in a displacement of the instrument-carrying zone along said direction.

Thus, the movement of the steering wheel in the direction of the dashboard is markedly increased, thereby avoiding impact with the driver.

To ensure easy displacement of the instrument-carrying zone, the displacement means of the instrument-carrying zone can comprise at least one direction reverser system and at least one tractor element having a first end and a second end, the displacement of the first end of the tractor element resulting, at the second end, in the displacement of the said instrument-carrying zone.

In particular, the direction reverser system can comprise at least one substantially horizontal crosspiece around which the tractor element passes, and a first end of at least one tractor element can be connected to the steering column whilst a second end of said at least one tractor element is connected to the instrument-carrying zone.

In particular, to ensure as straight a displacement as possible of the instrument-carrying zone:

the steering column is preferably mounted movable along a direction determined so that it can move forward, on impact, towards the engine compartment, and the displacement means of the instrument-carrying zone comprise at least one of a strap and a cable having a first end fixed to from a shaft connected to the steering column and adapted to move, between lateral rails, substantially parallel to the direction of displacement of the said steering column when said steering column moves towards the engine compartment, and, from said first end, each said at least one of said strap and cable passes behind a middle crosspiece fixed to the dashboard in order to permit a first direction reversal of at least one of said strap and cable, then passes around a high crosspiece which is fixed to the dashboard and defines a second direction reverser, said at least one strap and cable being linked, at its second end, to a low crosspiece which is fixed to a lower part of the instrument-carrying zone and is adapted to move, on lateral slides fixed to the dashboard, in one of an upward vertical direction and a direction having an upward vertical component.

According to a complementary characteristic, the tractor element(s) will be preferably placed on the direction reverser system in such a way that, on impact, the instrument-carrying zone begins to move whilst the steering column is still moving towards the engine compartment.

In practice, the straps (or cables) will be very lightly positioned on the crosspieces so that the displacement of the instrument-carrying zone is slightly retarded in the time following the displacement of the steering column. Thus, the displacement of the instrument-carrying zone will begin after the steering column has already covered several centimeters towards the engine compartment, that is to say several milliseconds after impact.

According to a complementary aspect, the angle of inclination between the direction of displacement of the instrument-carrying zone and the horizontal may lie between about 60° and 80°, and preferably near 70°. Thus, the displacement of the instrument-carrying zone will be optimal, in this configuration of the security device. The instrument-carrying zone will be "ejected" neither too high nor too far forward so that it does not impact the windscreen of the vehicle.

According to an alternative which permits the assurance of an easy displacement of the instrument-carrying zone, the displacement means of the instrument-carrying zone will comprise for preference:

at least one drive pin of the instrument-carrying zone, and at least one lateral slide attached to the dashboard and within which at least one guiding member attached to the instrument-carrying zone is slidably mounted in order to displace the said zone in one of said upward vertical direction and a direction having an upward vertical component.

In particular, the displacement means of the instrument-carrying zone can comprise:

lateral slides within each of which is disposed at least one guiding member fixed to the instrument-carrying zone and adapted to displace the instrument-carrying zone along said slides under the effect of the displacement of the steering column towards the engine compartment, and drive pins connecting the steering column to the instrument-carrying zone through lateral housing so that, on impact, the displacement of the steering column towards the engine compartment results, by the intermediary of the drive pins, in the displacement of the instrument-carrying zone according to said direction.

According to a complementary aspect, the angle of inclination between the direction of displacement of the instrument-carrying zone and the horizontal can lie between about 10° and 30°, and for preference near to 20°. Thus, the displacement of the instrument-carrying zone will be optimal, in this configuration of the security device.

Figure 2:
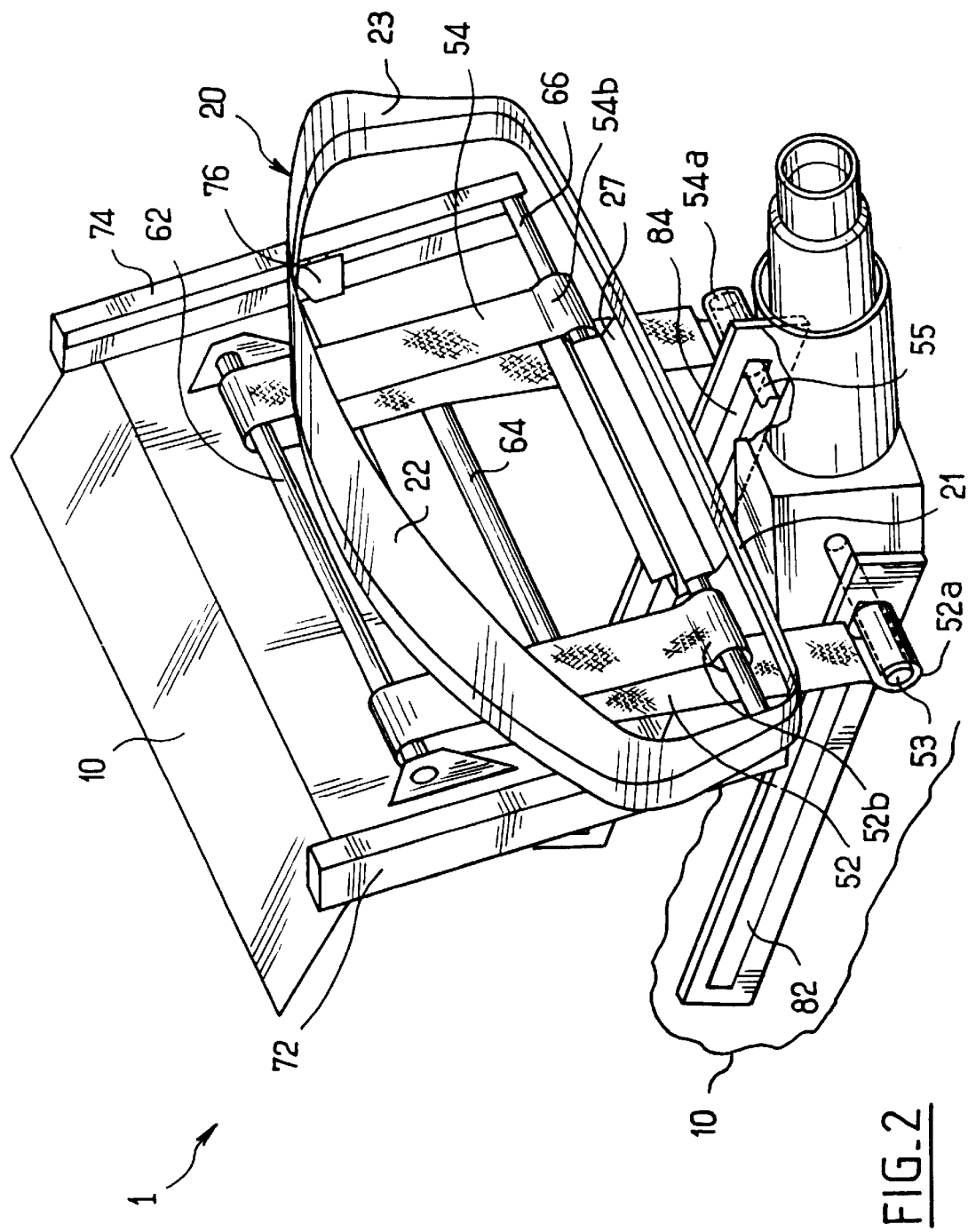
Figure 3:
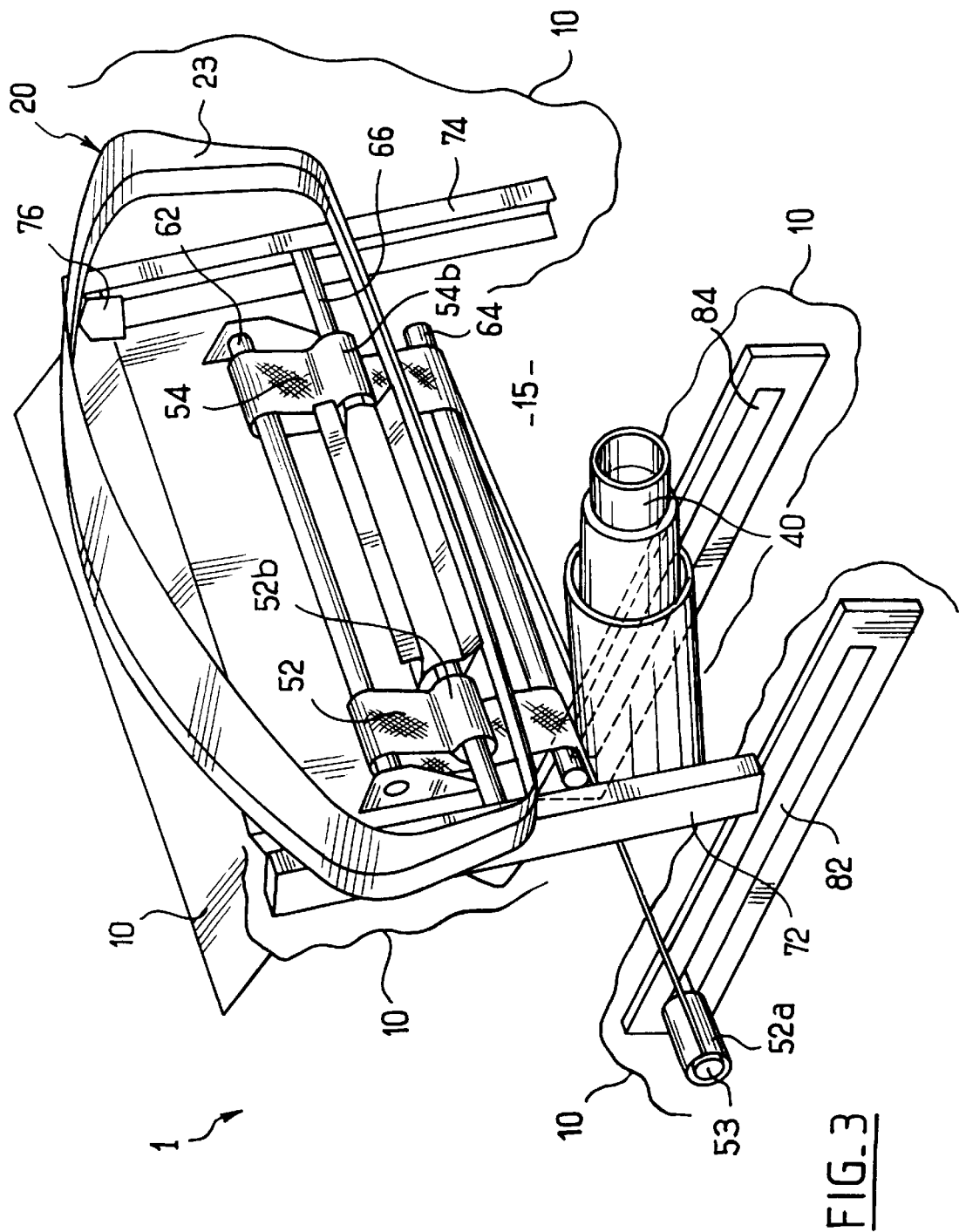
Figure 4:
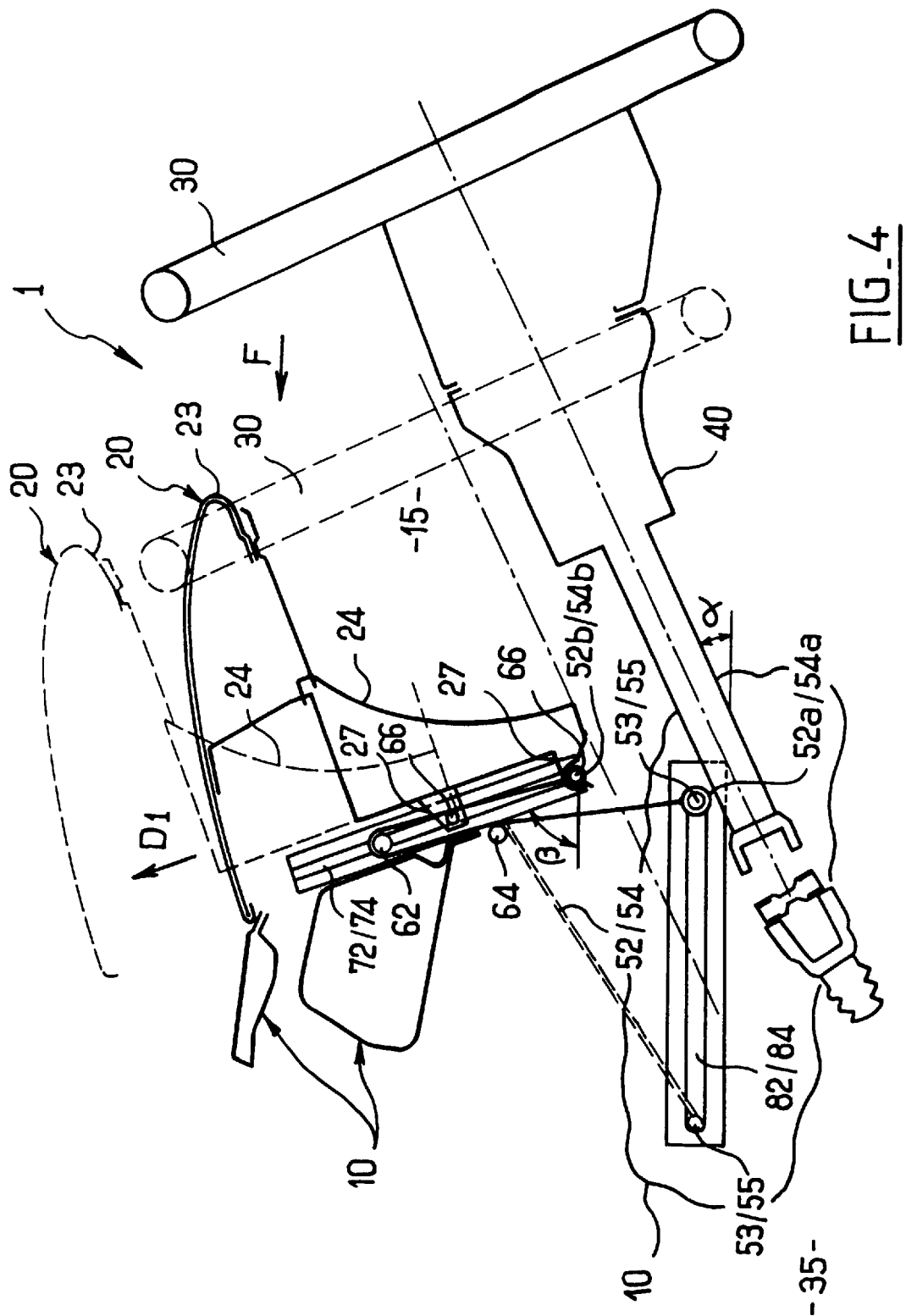
Figure 5:
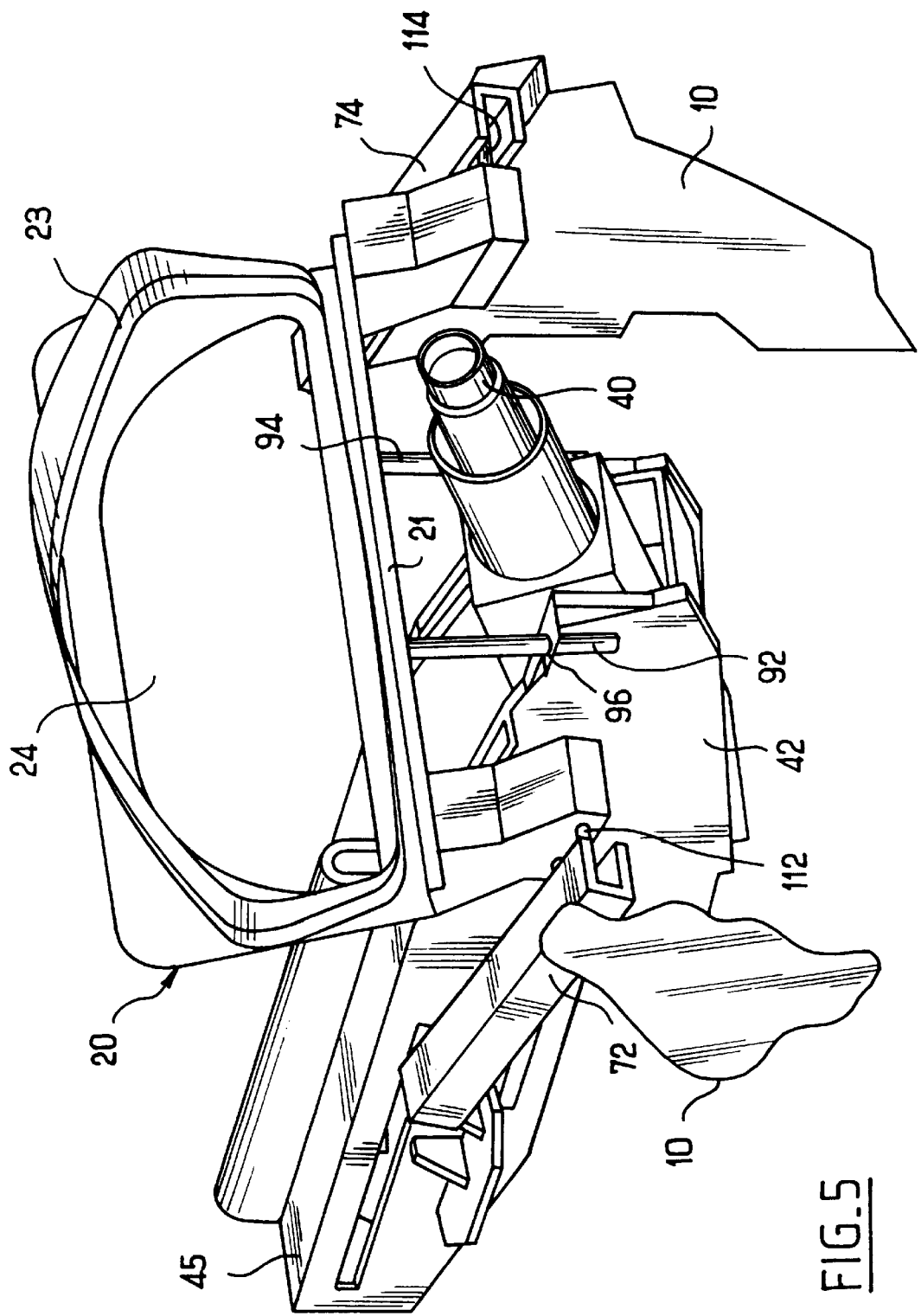
Figure 6:
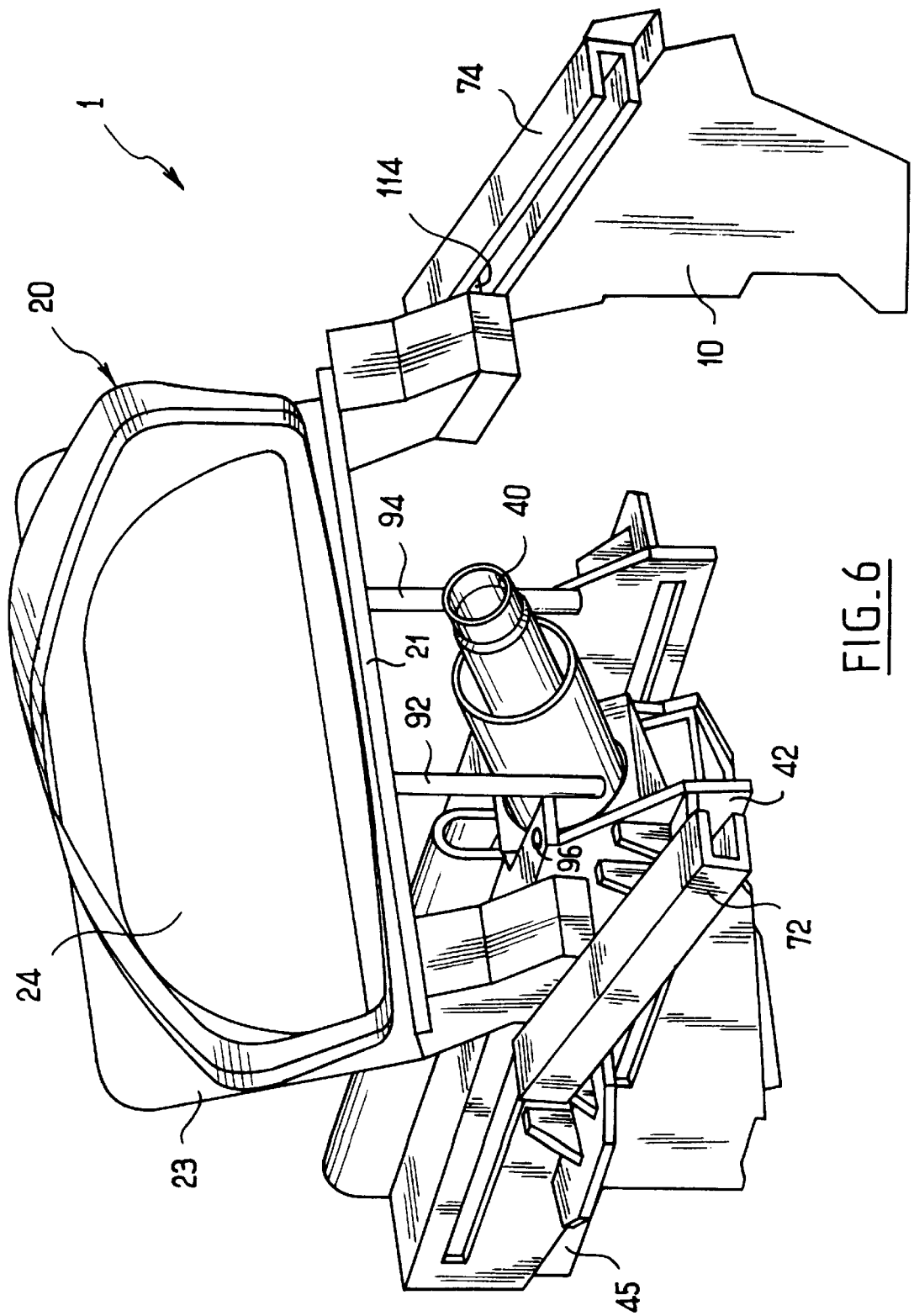
Figure 7:
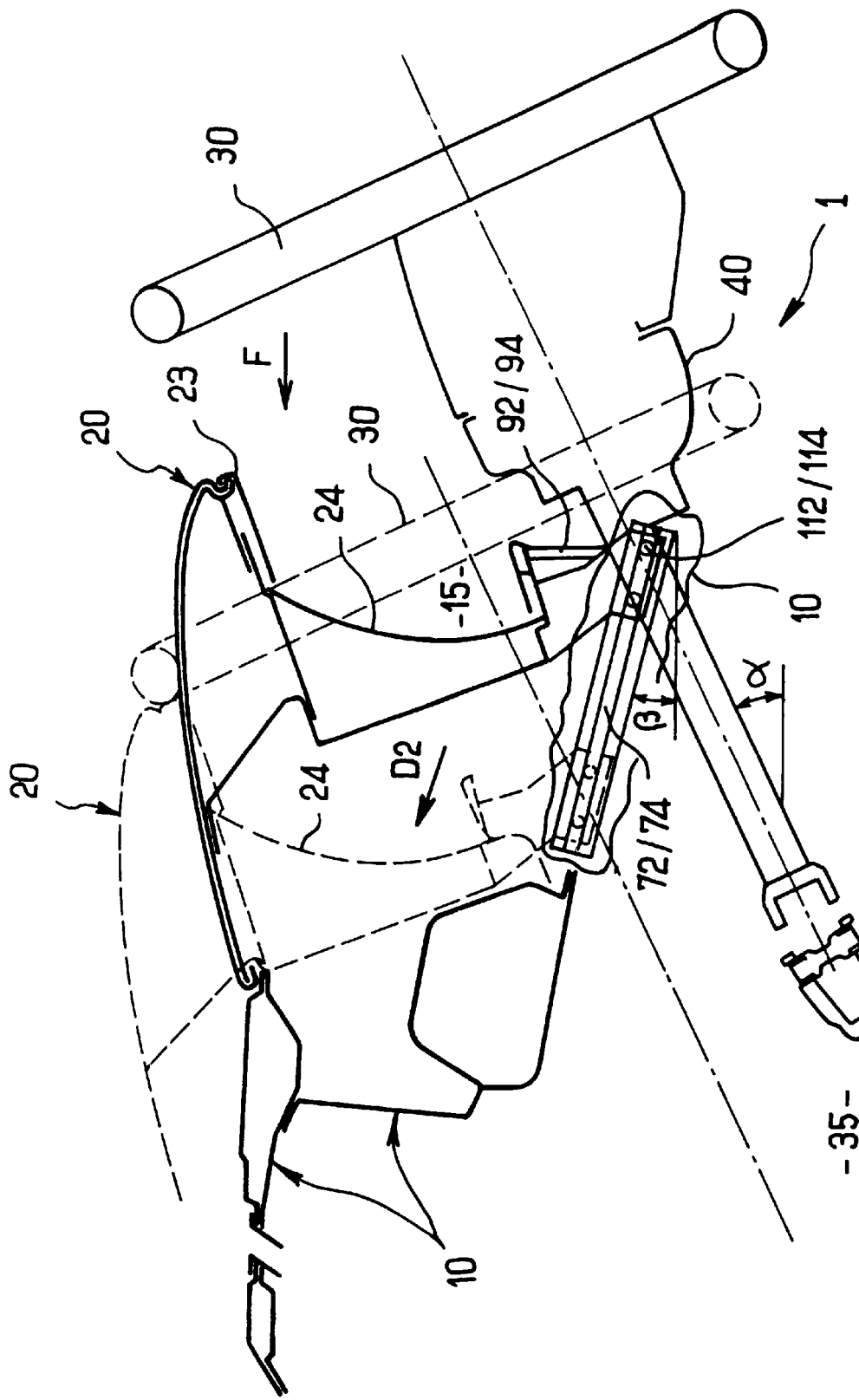

The invention and the manner of putting it into operation will be shown more clearly with the aid of the description which follows, made with reference to the drawings in which:

FIG. 1 is a front view of the device of the invention,

FIG. 2 is a perspective view of a first embodiment of the invention, in a normal position, FIG. 3 is identical to FIG. 2 but in which the device is shown after impact, FIG. 4 is a section view of FIGS. 2 and 3, FIG. 5 is a perspective view of a second embodiment of the invention, in a normal position, FIG. 6 is identical to FIG. 4 but in which the device is shown after impact, FIG. 7 is a section view of FIGS. 5 and 6.

FIG. 1 represents a security device 1 conforming to the invention. In this FIG. 1, is seen a dashboard 10 of plastics material of which only the part in front of the driver is represented. This dashboard 10, which normally extends between the left and right sides of the vehicle, includes an instrument-carrying zone 20, also called a combined dashboard, disposed opposite the driver (not represented) and opposite a steering wheel 30. This instrument-carrying zone 20, also of plastics material, is equipped with a protection visor 23 encircling a window 24 behind which are found various on-board instruments 25 (rev counter, speedometer, milometer, gauges, warning lights of the functioning of the vehicle). The instruments 25 are visible by the driver through the spokes of the steering wheel 30, which is mounted on a steering column 40 surrounded by a first movable housing 42 movable with it and by a second, fixed, protection housing 45 (see FIGS. 5 and 6) connected for example to the dashboard 10 and into the interior of which the column 40 and its movable housing 42 can move. The column 40 is inclined in the direction of an engine compartment 35 (shown schematically in FIGS. 2 to 7) making a certain angle α with the horizontal (or the floor of the vehicle). This steering column 40 is thus here of retractable type, that it to say that on impact (in particular frontal or semi-frontal) of the vehicle against an obstacle, it moves forward between the fixed casing (see FIGS. 5 and 6) substantially following an angle lying between horizontal and the angle α and gives way in the direction of the engine compartment 35 along a direction F. Its movement brings about that of the steering wheel 30 in the direction of the instrument-carrying zone 20 in order to prevent the driver hitting the said steering wheel 30 or other blunt objects near to this latter (indicator levers) too violently and too quickly. The means used to render this column 40 retractable on impact are not described here as they do not form part of the patent application. These means can consist of frangible pins or zones of least resistance, as described in the patents cited in the preamble.

In FIG. 2, it is seen that the device 1 is provided with a substantially horizontal fixed high crosspiece 62 and fixed to the structure of a dashboard 10 by its ends, behind and above the visor 23 (that is to say nearer to the windscreen and the engine compartment 35 than the said visor 23).

A fixed middle crosspiece 64, parallel to the high crosspiece 62, is also fixed to the structure of the dashboard 10 by its ends.

A low cross piece 66, parallel to the two others (thus also substantially horizontal), is fixed to a lower part 21 of the visor 23 of the instrument-carrying zone 20 by means of a fixing claw 27. This crosspiece 66 can run in two lateral slides 72 and 74 fixed to a part of the structure of the dashboard 10 in such a way as to guide the rectilinear displacement of the instrument-carrying zone 20 as is described further on. In the normal position of the instrument-carrying zone 20 (that is to say before impact), the low crosspiece 66 is clipped in the lateral slides 72 and 74 in order to maintain the instrument-carrying zone 20 facing the driver, and also to avoid it coming away as a result of vibration. Guide pins 76 (shafts for example) are likewise provided on a high part 22 of the visor 23 to help to maintain it in place in a normal position. These pins 76 are likewise adapted to run in slides 72 and 74 in order to guide the displacement of the instrument-carrying zone 20 on impact of the vehicle.

Two straps 52 and 54 are attached, at a first end 52a and 54a, to rigid shafts (or pins) 53 and 55 fixed to the steering column 40 and able to slide within two lateral rails 82 and 84, for example fixed to a part of the structure of the dashboard 10 to act as guiding slides of the shafts 53 and 55. From their first ends 52a and 54a, the straps 52 and 54 rise and pass in front of the middle crosspiece 64 which defines a first direction reverser. The straps 52 and 54 rise again and pass behind, then around, the high crosspiece 62 (which then acts as a second direction reverser) in such a way as to describe a hair-pin loop (or an elbow), for example at about 180°. Finally, the straps 52 and 54 re-descend and are fixed, at their second ends 52b and 54b, on the low crosspiece 66, for example by a closed sewn loop (or by adhesive or any other means). These different passages of straps 52 and 54 in front of, behind and/or around the different crosspieces 62, 64 and 66 form a direction reverser system of the straps 52 and 54.

The straps 52 and 54 can either be positioned lightly on the direction reverser system in a normal position of the instrument-carrying zone 20, or can be placed under a tension which is less than that which it would be necessary to exert in order to break the clip connection between the crosspiece 66 and the lateral slides 72 and 74.

The different crosspieces 62, 64 and 66 will preferably be of rigid material, for example of metal, and possibly covered with a plastics covering in order to reduce the friction of the straps 52 and 54.

We shall now describe with the aid of FIGS. 2 to 4 what happens in the case of impact of the vehicle against an obstacle. In this case, the steering column 40 moves towards the engine compartment 35 in a direction F between the horizontal and the angle α, for example horizontally. The steering wheel 40 moves forward in the same way following the same substantially horizontal direction F, whilst approaching the instrument-carrying zone 20 of the dashboard 10. Simultaneously, the instrument-carrying zone 20 is displaced in a vertical direction D1, or one having at least an upward vertical component, whilst making an angle β with the horizontal (this angle being that made by the lateral slides 72 and 74 with the horizontal). Typically this angle β will be between 60° and 80°, and preferably will be near to 70°. With regard to this, when the steering column 40 moves forward into the engine compartment 35 following impact (see dotted lines in FIG. 2), it exerts an increased tension on the straps 52 and 54 which is transmitted to the combined instrument panel 20 by the intermediary of the crosspieces 62, 64 and 66 of the direction reverser system. The steering column 40 then carries the shafts 53 and 55 to the interior of their lateral guide rails 82 and 84 until the said shafts stop against these rails. The rising of the instrument-carrying zone 20 is guided by the cooperation of the lateral slides 72 and 74, by the low crosspiece 66 and the guide pins 76.

If the straps 52 and 54 are positioned lightly on the direction reverser system, the displacement of the instrument-carrying zone 20 is not simultaneous with that of the steering column 40 as it is necessary to wait until the straps 52 and 54 become taut and fulfil their role as tractor means. Thus, the displacement of the instrument-carrying zone 20 can be delayed in time by several thousandths to several hundredths of a second after impact, which does not have harmful consequence in that the displacement of the steering wheel 30 in the direction of the combined instrument panel 20 is only several centimeters during this lapse of time.

Consequently, the steering wheel 30, instead of coming to a stop against the instrument-carrying zone 20 of the dashboard 10, as was the case in all prior art devices, slides into a space 15 left vacant by the ejection of the instrument-carrying zone 20 (see FIG. 3 and dotted lines in FIG. 4). The steering column 40 as well as the steering wheel 30 are thus displaced towards the engine compartment 35 by a distance far greater than in the prior art devices, which is a guarantee of security because this avoids the driver being injured by hitting the steering wheel.

Naturally, the straps 52 and 54 can be replaced by cables or by other similar tractor means, in which case the horizontal crosspieces will for preference be equipped with pulleys.

FIGS. 5 to 7 represent an alternative embodiment of the driver protection device of FIGS. 2 to 4.

In this device 1, the instrument-carrying zone 20 is provided with two drive pins 92 and 94 (soldered for example) fixed to its lower part 21. These pins 92 and 94 are also linked to the steering column 40 and preferably disposed on either side of it They are disposed in appropriate lateral housings 96 in a part of the movable housing 42 of the steering column 40 in order to allow them a relevant displacement with respect to the said column 40 when this moves towards the engine compartment 35. The device also comprises lateral slides 72 and 74 linked to a part of the structure of the dashboard 10 and inclined with regard to the horizontal by an angle β lying between about 10° and 30°, and preferably near to 20°. Guide members 112 and 114 for example, shafts soldered or directly molded with the visor 23, fixed to the instrument-carrying zone 20 can slide in these slides 72 and 74.

In its normal position of use (before impact) represented in FIG. 5 and in solid line in FIG. 7, the instrument-carrying zone 20 is in a low position at the nearest point to the steering wheel 30, and the guide members 112 and 114 are also disposed at the nearest position to the driver, stopped against the slides 72 and 74. In order to guarantee the good condition of the instrument-carrying zone 20 before impact (notably in order to prevent it becoming detached by vibration), these members 112 and 114 can be clipped into their end position on the interior of the lateral slides 72 and 74, as in FIG. 2.

As in the preceding case, FIGS. 6 and 7 illustrate what happens in the case of impact of the vehicle against an obstacle. In this case (FIG. 6 and dotted lines of FIG. 7), the steering column 40 and its movable housing 42 advance substantially horizontally into the interior of the fixed housing 45 in the direction of the engine compartment 35 according to arrow F (as for FIGS. 3 and 4). In this displacement, it brings along with it the instrument-carrying zone 20 by the intermediary of the drive pins 92 and 94 which slide in housings 96 with a movement having a vertical component The combined instrument panel 20 is then displaced in a vertical direction D2, or one having at least an upward vertical component, the guide members 112 and 114 (which have become released) accompanying this movement within the lateral slides 72 and 74 so that the displacement is perfectly rectilinear. The pins 92 and 94 exit bit by bit from the housings 96 and leave these housings when the steering column has already covered a certain distance (several centimeters) towards the engine compartment, so that, by inertia, the instrument-carrying zone 20 continues to move in an upward direction according to direction D2 and the steering column 40 continues to move towards the engine compartment 35. Thus, the instrument-carrying zone 20 is retracted towards the front (and a little in a upward direction according to the angle of inclination β) in such a way as to leave a space 15, the steering wheel 30 can have a greater displacement towards the dashboard 10 than in devices of the prior art, which permits the reduction of driver impact.

A further arrangement not represented consists in utilizing an intermediate housing fixed to the steering column 40 and constituted by two half-shells disposed under the steering wheel 30. In this case, the instrument-carrying zone 20 is displaced by friction, for example, with the aid of two inclined parallel planes. On impact, the steering column 40 and at least its upper half-shell advance horizontally towards the engine compartment 45 according to arrow F. This movement of the half-shell results in the associated displacement of the instrument-carrying zone 20 according to a direction having at least an vertical component, as for the preceding figures. The inclination of the planes will determine the path that the column will follow in order to space the instrument-carrying zone 20 by the desired distance in order to free a space 15 big enough so that the displacement of the steering wheel towards the dashboard is increased.

Evidently, this device is compatible with a steering wheel equipped with an air bag permitting the absorption of the energy of the impact and the reduction of the risks of traumatisation resulting from it.

The invention is in no way limited to the embodiments presented as examples.

Thus, the angle of inclination β of the direction of displacement of the instrument-carrying zone 20 can vary as a function of the type of vehicle. In the particular case of a one-box vehicle, the dashboard is more extended towards the front and the windscreen is more upright than in a traditional saloon (two-box or three-box). Consequently, the instrument-carrying zone can be displaced a little further towards the front The space freed for the steering wheel will be obtained with a combined instrument panel which is ejected at a lower level, thus with even less risk for the driver.

In the case where the pedals move back as well into the engine compartment in the case of a frontal impact, the displacement of the combined instrument panel can be controlled by the displacement of the said pedals in a forward direction, for example with the aid of a strap system similar to that shown in FIGS. 2 to 4.

The different parts (guide members, pins, low crosspiece, shaft of the straps) in movement on the different slides or rails can be equipped with castors (for example in nylon) and the slides can be provided with a guide way in a shape appropriate to facilitate the displacement of the combined instrument panel on impact. It is equally possible to envisage an arrangement using toothed wheels/rack and pinion.

The displacement of the instrument-carrying zone 20 can be equally triggered by pyrotechnic means such as those utilized for the pretensioners of seat belts. In this case, it is not necessarily the displacement in a forward direction of the steering column which will result in the displacement of the combined instrument panel in an upward direction. A system totally independent of the steering column can equally well be envisaged, at the very least regarding the mechanical displacement means. The security device can for example comprise a sensor which will give information to the pyrotechnic system on the position of the steering column. When this has started to move forward in the direction of the engine compartment, then the pyrotechnic means can be set off in such a way as to displace the instrument-carrying zone 20. This can in particular be adapted to the arrangement using straps, these latter then no longer being attached to the steering column but to the pyrotechnic activating system such as a reel.

What is claimed is:

1. A protection device for the driver of a vehicle equipped with a dashboard and a steering wheel, in order to provide, on impact, a displacement of the steering wheel towards the dashboard, said steering wheel being mounted on a steering column passing under an instrument-carrying zone situated with regard to the steering wheel and connected to, but distinct from, the dashboard, said protection device comprising means for displacement of the instrument-carrying zone, the displacement means being adapted to move the instrument-carrying zone, on impact, in one of an upward vertical direction and a direction having a vertical upward component, wherein the means for displacement of the instrument-carrying zone connect the steering column directly to the instrument-carrying zone, so that, on impact, said displacement of the steering column results in a displacement of the instrument-carrying zone along said direction.

2. The device according to claim 1, wherein the displacement means of the instrument-carrying zone comprise, at least one direction reverser system and at least a tractor element having a first end and a second end, the displacement of the first end of the tractor element resulting, at the second end, in the displacement of said instrument-carrying zone.

3. The device according to claim 2, wherein:
the direction reverser system comprises at least one substantially horizontal crosspiece around which the tractor element passes, and
a first end of at least one tractor element is connected to the steering column whilst a second end of said at least tractor element is connected to the instrument-carrying zone.

4. The device according to claim 3, wherein:
the steering column is mounted movable along a determined direction so that it moves, on impact, towards an engine compartment, and
the displacement means of the instrument-carrying zone comprise at least one of a strap and a cable having a first end fixed to a shaft connected to the steering column and adapted to move, between lateral rails, substantially parallel to the direction of displacement of the steering column when said steering column moves towards the engine compartment, and, from said first end, each said at least one of said strap and cable passes behind a middle crosspiece fixed to the dashboard in order to allow a first direction reversal of at least one of said strap and cable, then passes around a high crosspiece which is fixed to the dashboard and defines a second direction reverser, said at least one strap and cable being linked, at a second end, to a low crosspiece which is fixed to a lower part of the instrument-carrying zone and which is adapted to move, on lateral slides fixed to the dashboard, in one of an upward vertical direction and a direction having an upward vertical component.

5. The device according to claim 2, wherein:
the steering column is mounted movable along a determined direction so that it moves, on impact, towards an engine compartment, and
the tractor element is disposed on the direction reverser system so that, on impact, the instrument-carrying zone begins to move only after the steering column has already begun to move towards the engine compartment.

6. The device according to claim 1, wherein the angle of inclination between the direction of displacement of the instrument-carrying zone and the horizontal lies between about 60° and 80°.

7. The device according to claim 1, wherein the displacement means of the instrument-carrying zone comprise:
at least one drive pin of the instrument-carrying zone, and
at least one lateral slide attached to the dashboard and within which at least one guiding member attached to the instrument-carrying zone is slidably mounted in order to displace the zone in one of said upward vertical direction and a direction having an upward vertical component.

8. The device according to claim 7, wherein
the steering column is mounted movable along a determined direction so that it moves, on impact, towards an engine compartment, and
the displacement means of the instrument-carrying zone comprise:
lateral slides within each of which is disposed at least one guiding member fixed to the instrument-carrying zone and adapted to displace the instrument-carrying zone along said slides under the effect of the displacement of the steering column towards an engine compartment, and
drive pins connecting the steering column to the instrument-carrying zone through lateral housing so that, on impact, the displacement of the steering column towards the engine compartment results, by the intermediary of the drive pins, in the displacement of the instrument-carrying zone according to said direction.

9. The device according to claim 7, wherein the angle of inclination between the direction of displacement of the instrument-carrying zone and the horizontal lies between about 10° and 30°.

* * * * *